UNITED STATES PATENT OFFICE.

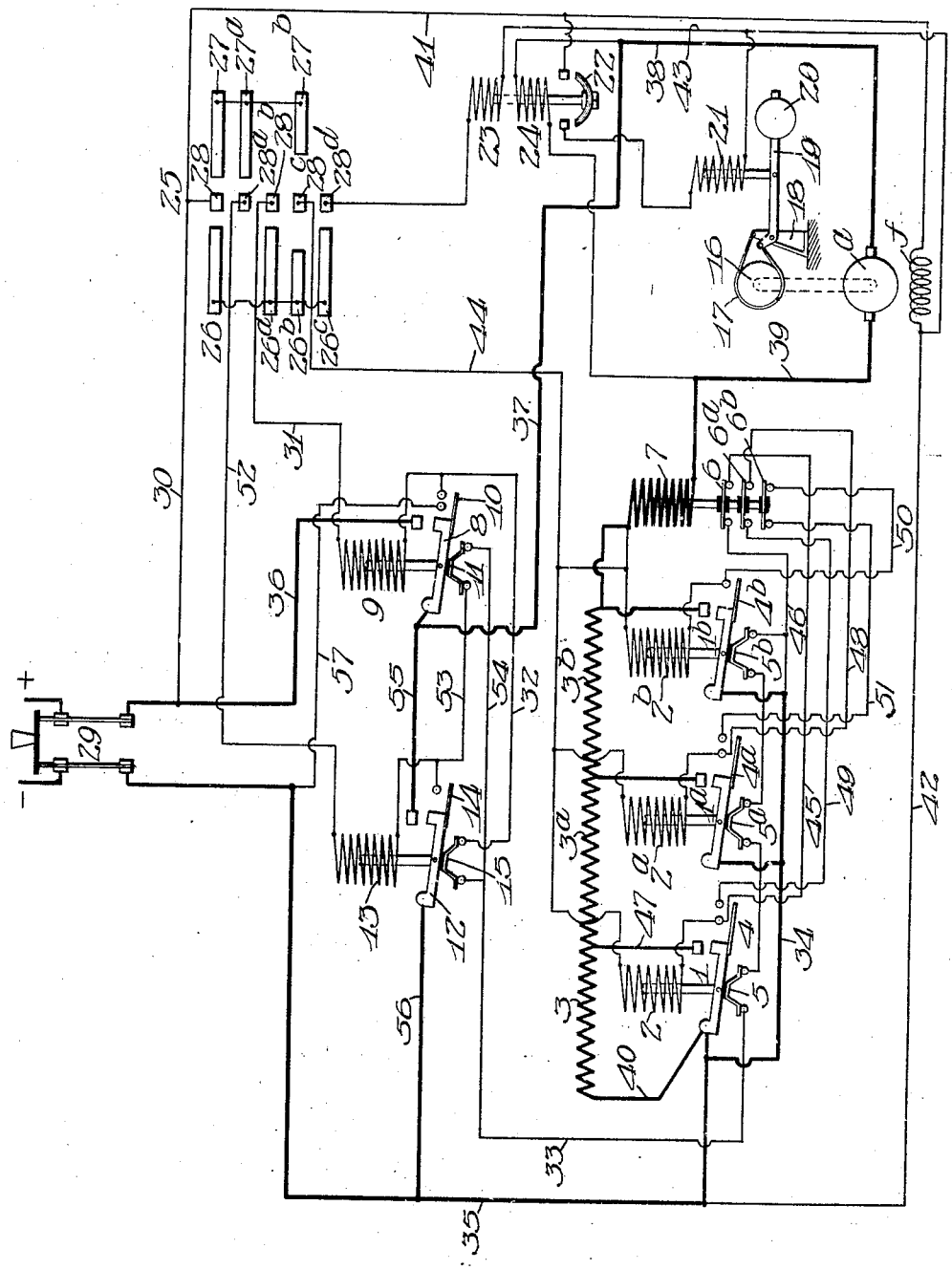

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

DYNAMIC-BRAKE CONTROLLER.

1,002,687.   Specification of Letters Patent.   Patented Sept. 5, 1911.

Application filed September 6, 1907, Serial No. 391,597. Renewed February 4, 1911. Serial No. 606,647.

*To all whom it may concern:*

Be it known that I, CLARK T. HENDERSON, a citizen of the United States, residing at Milwaukee, in the county of Milwaukee and State of Wisconsin, have invented new and useful Improvements in Dynamic-Brake Controllers, of which the following is a full, clear, concise, and exact description, reference being had to the accompanying drawing, forming a part of this specification.

My invention relates to improvements in motor controllers.

It applies particularly to controllers that are adapted to cause the motor to become a generator and act as a dynamic brake when it is disconnected from circuit and is running under the impetus it acquired while in operation. Such a result may be obtained by connecting a circuit across the armature, in which circuit is placed a resistance. The armature generates current and sends it through the circuit, which circuit may be called the braking circuit. The resistance in the braking circuit is sufficient to prevent the current from becoming so great as to endanger the armature. The braking force that is exerted by the armature depends upon its electrical load, which load is proportional to the braking current that is sent through the braking circuit. Inasmuch as the braking current decreases as the speed of the armature decreases, all other conditions remaining the same, the braking force decreases in proportion to the decrease of speed of the armature. Accordingly there is a tendency for the period taken by the motor to come to rest to be prolonged.

One of the objects of my invention is to provide means whereby the braking current will have a high mean value throughout the period of braking the motor.

In order to attain the object of my invention, I provide means for varying the resistance in the braking circuit, which means are adapted to decrease the resistance in the braking circuit as the speed of the armature decreases, whereby the braking current is maintained at a high value throughout the braking period, and the braking period is thus reduced to a minimum. In order to prevent the resistance from being removed from circuit too rapidly, and at the same time be removed from circuit as rapidly as the conditions will allow without endangering the armature, I provide a device by means of which the progress of removing the resistance from circuit will be arrested or retarded whenever the braking current rises above a predetermined limit.

In accordance with the preferred form of my invention I provide a plurality of electro-magnetically operated resistance switches which control the resistance in the braking circuit. These switches, and also the resistances, may be the same as are used for starting the motor. The operation of these switches is so controlled that the same respond successively and thus gradually remove the resistance from circuit. In order to arrest the progressive operation of the switches if the braking current becomes abnormal and thus prevent further removal of the resistance from circuit until the current subsides to a normal value, I provide a magnetically operated relay device that responds to the braking current, or to a condition which is controlled thereby. The relay device controls the circuits of the operating windings of the resistance switches. It is operated by a winding preferably placed in the braking circuit in series with the armature. If the braking current rises above a predetermined point, the relay device operates and accordingly prevents further respondation of the operating windings of the resistance switches until the current subsides. In order to prevent the relay device from deënergizing the operating windings of the switches that have been closed, I provide means whereby when each switch is closed its operating winding is rendered independent of said relay device.

In order to more particularly set forth the characteristic features of my invention as the same may be embodied in practice, I have diagrammatically illustrated in the accompanying drawing a system in which my invention is exemplified.

I am, of course, aware that the objects of my invention may be attained through the agency of various instrumentalities, and that the same ultimate results may be attained by various organizations of elements.

I shall now proceed to describe the system illustrated in the accompanying drawing.

I provide a plurality of resistance switches 1, 1ª and 1ᵇ, which are operated by electro-magnetic windings, 2, 2ª and 2ᵇ respectively. These switches are connected in circuit to short-circuit resistance sections, 3, 3ª and 3ᵇ respectively. The accelerating switches are provided with auxiliary contacts 4, 4ª and 4ᵇ, and interlocking contacts 5, 5ª and 5ᵇ. The auxiliary contact 4 controls the circuit of winding 2ª, and the auxiliary contact 4ª controls the circuit of winding 2ᵇ. The circuits of the windings 2, 2ª and 2ᵇ are also controlled by relay switches 6, 6ª and 6ᵇ respectively, which relay switches are operated by electro-magnetic winding 7, which is connected in circuit in series with the motor armature.

The motor is provided with an armature $a$, and a field winding $f$. The motor circuit is controlled by means of the main switch 8, which is operated by electromagnetic winding 9. The main switch is provided with an auxiliary contact 10 and an interlocking contact 11. The braking circuit which extends across the motor armature is controlled by means of a braking switch 12, which is operated by an electromagnet 13. The braking switch 12 is provided with an auxiliary contact 14 and interlocking contact 15. The motor armature or the machinery driven by the motor is connected to a mechanical brake. The brake I have diagrammatically illustrated in the drawing, has a wheel 16 having thereon a brake band 17. The brake band is connected to a stationary support 18, and to a lever 19, which is pivoted upon said support. The lever carries a weight 20. The weight normally depresses the lever and causes the brake band 17 to be tightened around the brake wheel 16, thereby holding the armature $a$, or the machinery connected to said armature. The brake is released by means of an electro-magnetic winding 21, which serves to raise the lever 19. The circuit of this winding is controlled by means of a brake relay switch 22, the operation of which is controlled by two electro-magnetic windings 23 and 24.

The operation of the controller is directed by means of a master switch 25, which may be of the drum type. On one side of the drum is mounted a plurality of contact segments 26, 26ª, 26ᵇ and 26ᶜ. On the other side a plurality of contact segments 27, 27ª and 27ᵇ. Between these segments is mounted a plurality of stationary contacts 28, 28ª, 28ᵇ, 28ᶜ and 28ᵈ.

The line from which current is obtained is provided with a line switch 29. If the master controller 25 be turned to the right, segments 26, 26ª, 26ᵇ and 26ᶜ will engage contacts 28, 28ᵇ, 28ᶜ and 28ᵈ respectively. Circuit will thus be closed from the positive line through conductor 30, contact 28, segment 26, segment 26ª, contact 28ᵇ, conductor 31, winding 9, conductor 32, interlocking contact 15, conductor 33, interlocking contacts 5, 5ª and 5ᵇ, conductor 34 and conductor 35 to the negative line. Accordingly the motor switch 8 will be closed and current will flow from the positive line through conductor 36, switch 8, conductor 37, conductor 38, armature $a$, conductor 39, series relay winding 7, resistance sections 3ᵇ, 3ª and 3, conductor 40 to the negative line 35. The motor will thus be started with all the starting resistance 3, 3ª and 3ᵇ in circuit with its armature. The motor field circuit extends from the positive line through conductor 30, conductor 41, shunt field winding $f$, conductor 42 to the negative line 35. The brake relay switch 22 will be closed by electro-magnetic winding 23, which winding is connected in circuit from the positive line through conductor 30, contact 28, segment 26, segment 26ᶜ, contact 28ᵈ, winding 23, thence through conductor 43, conductor 42, to the negative line. Accordingly switch 22 will be closed completing the circuit through solenoid 21 which will thus be energized and raise the lever 19, thereby releasing the mechanical brake. When switch 8 is closed the circuit for winding 9 is completed by auxiliary switch 10 and conductor 57 connected to the negative line, thus rendering said main switch independent of said interlocking contacts 5, 5ª and 5ᵇ. The motor having now been started with all the starting resistance in circuit, the switches 1, 1ª and 1ᵇ will be closed successively, thereby removing the resistance sections 3, 3ª and 3ᵇ from circuit, one after the other. The operating magnets 2, 2ª and 2ᵇ of the resistance switches are all connected to the positive line through the master switch which establishes a circuit leading from the positive line over conductor 30, through contact 28, segment 26, segment 26ᵇ, contact 28ᶜ, conductor 44, to one of the terminals of each of the windings 2, 2ª and 2ᵇ. The winding 2 is connected to the negative line through conductor 45, relay switch 6, conductors 46 and 34, to the negative line. Accordingly resistance switch 1 will be closed first, thereby short-circuiting resistance section 3, the short-circuit around said resistance section extending through conductor 47 and resistance switch 1. If the motor current be abnormal before the resistance switch 1 is closed, the series relay magnet 7 will respond and open the relay switches. Accordingly, the circuit of winding 2 will be opened by relay switch 6 until the surge of current subsides, whereby resistance switch 1 will be prevented from closing so long as the current remains abnormal. When resistance switch 1 is closed, the auxiliary switch 4 is closed, thereby connecting winding $2^a$ to the negative side of the line by a circuit leading through conductor 48, relay switch $6^a$, conductor 49, auxiliary switch 4, resistance switch 1 to the negative side of the line. If the current be abnormal after resistance section 3 is removed from circuit the series relay magnet 7 will again respond. The circuit of winding $2^a$ will thus be opened by relay switch $6^a$. Hence, resistance switch $1^a$ will not close. As soon as the current becomes normal again relay switch $6^a$ will be closed, and accordingly winding $2^a$ will become energized and close resistance switch $1^a$. When resistance switch 1 is closed it causes auxiliary contact 4 to connect winding 2 to the negative line through auxiliary resistance switch 1, and accordingly relay switch 6 is short-circuited, whereby winding 2 is rendered independent of said relay switch. In consequence the resistance switch 1 will remain closed, notwithstanding the opening of relay switch 6, when the current again becomes abnormal. When resistance switch $1^a$ closes, its auxiliary contact connects winding $2^b$ to the negative line through conductor 50, relay switch $6^b$, conductor 51, auxiliary contact $4^a$, resistance switch $1^a$, and conductor 34. The auxiliary contact $4^a$ connects winding $2^a$ directly to the negative line through resistance switch $1^a$. Accordingly relay switch $6^a$ is short-circuited and said winding $2^a$ is rendered independent of said relay switch. When resistance switch $1^b$ is closed its winding $2^b$ is connected directly to the negative line, through auxiliary switch $4^b$ and resistance switch $1^b$, and accordingly relay switch $6^b$ is short-circuited and said winding is rendered independent of said relay switch.

When the resistance switches 1, $1^a$ and $1^b$ are closed interlocking switches 5, $5^a$ and $5^b$ are opened. The purpose of the interlocking contacts will be hereinafter set forth.

If it is desired to stop the motor the master controller 25 is turned to the left, so that contacts 28, $28^a$ and $28^c$ are engaged by contacts 27, $27^a$ and $27^b$ respectively. Inasmuch as the circuit of winding 9 will be opened at contact $28^b$, the main switch 8 will be opened, and inasmuch as the circuit of winding 23 of the brake relay switch is opened at contact $28^d$, the winding 23 will be deënergized. The brake relay switch 22, however, will not open as it will be held in a closed position by winding 24, which is connected across the armature $a$ and is energized by the current developed in said armature. When the armature comes to rest and ceases to develop sufficient current to energize winding 24, the brake relay switch will be opened, and the mechanical brake will be applied thereby firmly holding the armature against rotation. When contact $28^c$ passes from segment $26^b$ to segment $27^b$, the controlling circuit leading to the operating windings 2, $2^a$ and $2^b$ of the resistance switches will be opened. Accordingly these switches will be opened and the resistance 3, $3^a$ and $3^b$ will be placed in circuit. The braking switch 12 will now be closed by winding 13, which winding will be connected in a circuit leading from the positive line through conductor 30, contact 28, segment 27, segment $27^a$, contact $28^a$, conductor 52, winding 13, conductor 53, interlocking switch 11, and conductors 54 and 33, interlocking switches 5, $5^a$ and $5^b$, conductors 34 and 35 to the negative line. When braking switch 12 is closed the circuit through the winding 13 thereof is completed by auxiliary switch 14, switch 12 and conductor 56 to the negative line thereby rendering said braking switch independent of interlocking switches 5, $5^a$, and $5^b$. A closed circuit or loop in which is arranged the resistance 3, $3^a$ and $3^b$ is thus connected across the terminals of the armature $a$, which circuit extends from one terminal of the armature through conductor 38, conductor 37, conductor 55, switch 12, conductor 56, conductor 35, resistance 3, $3^a$ and $3^b$, winding 7, conductor 39 to the other terminal of the armature. The motor will now become a generator, owing to the fact that its armature $a$ will continue to rotate for a while owing to the impetus it acquired while the motor was in operation. Accordingly the armature will send current through the closed loop, including the resistance. Such action causes the motor to act as a dynamic brake, and accordingly the armature will be quickly and smoothly brought to rest. The braking force that is exerted by the armature is proportional to its electrical load, which load depends upon the current which may flow through the closed loop. As the speed of the armature decreases, the braking current in the closed loop naturally tends to decrease, and in consequence the braking force exerted by the armature tends to decrease. Inasmuch as the windings 2, $2^a$ and $2^b$ are connected to the positive line through a path leading to said line through conductor 30, contact 28, segment 27, segment $27^b$, contact $28^c$ and conductor 44, the switches 1, $1^a$ and $1^b$ will be closed successively in the same manner as previously described, thereby removing the resistance sections 3, $3^a$ and $3^b$ from circuit as the speed of the armature $a$ decreases. Accordingly the braking current will be kept at a high value throughout the braking period, whereby the time of this period will be shortened. The series relay magnet 7 serves to open the relay switches and arrests the progressive operation of the resistance switches if the resistance is removed from circuit too rapidly and the braking current becomes too great. If the braking current is abnormal before resistance switch 1 closes, the series relay magnet responds and thus prevents said resistance switch from closing until the current falls below a predetermined point. If after the switch 1 closes, the current again becomes abnormal the series relay magnet 7 will respond and prevent the switch 1ᵃ from closing so long as the current remains abnormal, and so on, the resistance switches operating successively and having the progressive operations thereof arrested whenever the current becomes abnormal. Accordingly the braking current will be prevented from rising above a predetermined limit, and at the same time will be proportioned at a high value throughout the braking period, thereby reducing the time required to bring the armature to rest. When the motor nearly comes to rest and ceases to develop sufficient current to energize winding 24, the relay brake switch 22 will be opened, and accordingly the mechanical brake will be applied.

Inasmuch as the interlocking switches 5, 5ᵃ and 5ᵇ are arranged in the circuits of the operating windings 9 and 13, it will be impossible for the braking switch 12 or the main switch 8 to close, unless the resistance switches 1, 1ᵃ and 1ᵇ are open. Accordingly the motor circuit or the braking circuit can not be closed unless the resistance 3, 3ᵃ and 3ᵇ is first included in the armature circuit. Furthermore, inasmuch as the interlocking switch 15 is in the circuit of the operating winding 9 and interlocking switch 11 is in the circuit of the operating winding 13, it will be impossible for the main switch 8 to be closed unless the braking switch 12 is open, and also it will be impossible for the braking switch 12 to be closed unless the main switch 8 is open.

The use of the motor as a dynamic brake is advantageous because of the fact that it is not subjected to wear during the braking action and accordingly does not require adjustment in order to bring the load to rest in a given period. Inasmuch as the mechanical brake is not applied until the motor nearly comes to rest it is subjected to very little wear and accordingly very seldom requires adjustment.

I am, of course, aware that my invention is capable of application in various relations and that it may be used on various classes of machinery where it is necessary to use a brake in bringing the machine to rest, as is usually the case with machines that have to be started and stopped at frequent intervals.

Having thus described my invention what I claim as new and desire to secure by Letters Patent, is:

1. In a controller for electric motors, in combination, means for closing the motor circuit, a mechanical brake, an electromagnetic winding for rendering said brake inoperative, means for causing the motor to act as a dynamic brake and a single automatic device for energizing said electromagnetic winding upon closure of the motor circuit and maintaining the same energized until the speed of the motor decreases to a predetermined degree under dynamic braking action.

2. The combination with a controller for starting and stopping an electric motor, a mechanical brake, means for closing the motor circuit, electromagnetic means for maintaining said brake inoperative while the motor circuit is closed, means for disconnecting the motor from circuit, electromagnetic means for connecting a circuit across the terminals of the motor armature, means to energize said last mentioned electromagnetic means after the motor circuit is interrupted, and electromagnetic means connected in circuit for maintaining said brake inoperative until the armature approaches a condition of rest.

3. In a controller for stopping an electric motor, in combination, means for opening the motor circuit, electromagnetic means for connecting a circuit across the terminals of the motor armature, means for energizing said electromagnetic means after the motor circuit is opened, a mechanical brake, an electro-responsive device adapted to maintain said brake inoperative, and an electromagnetically operated switch for controlling the circuit through the winding of said electro-responsive device, the winding of said electromagnetically operated switch being connected across the terminals of the armature.

4. In a motor controller, in combination, a variable resistance connected across the terminals of the motor armature, means for arresting the removal of said resistance from circuit when the armature current rises above a predetermined value, a mechanical brake operatively connected with said armature, and electroresponsive means energized upon closure of the motor circuit for rendering said mechanical brake inoperative until the current through said armature falls to a predetermined point.

5. In a motor controller, in combination, a variable resistance connected across the terminals of the motor armature, means for removing said resistance from circuit gradually as the armature speed decreases, means for arresting the removal of said resistance from circuit as the armature circuit rises above a predetermined value, a mechanical brake operatively connected with said armature, electro-responsive means responsive to the armature current for maintaining said brake inoperative until the armature current falls to a predetermined value, said electroresponsive means being arranged to also respond upon closure of the motor circuit.

6. In a controller for stopping an electric motor, in combination, means for disconnecting the motor from circuit, means for connecting a variable resistance across the terminals of the armature, means for removing said resistance from circuit gradually as the armature speed decreases, means for arresting the removal of said resistance from circuit when the armature current rises above a predetermined value, a mechanical brake operatively connected with said armature, electro-responsive means responsive to the armature current for maintaining said brake inoperative until the armature current falls to a predetermined value, said electro-responsive means having a winding permanently connected across the terminals of the motor armature.

7. In a controller for stopping and starting an electric motor, a variable resistance, means for removing said resistance from circuit gradually, means for arresting the removal of said resistance from circuit when the armature current rises above a predetermined value, a brake operatively connected with said armature, an electro-responsive means for maintaining said brake inoperative while the motor circuit is closed, means for connecting said resistance in series with the motor, means for connecting said resistance across the terminals of the armature, and means for rendering said electro-responsive means responsive to the armature current when said resistance is connected in shunt therewith.

8. In a controller for starting and stopping a motor, in combination, a variable resistance, a plurality of electro-magnetically operated resistance switches for removing said resistance from circuit gradually, a series relay switch for preventing the too rapid removal of said resistance from circuit, a main switch for connecting said resistance in series with the motor armature, a braking switch for connecting said resistance across the terminals of the armature, a mechanical brake, an electro-responsive device for maintaining said brake inoperative, an electro-magnetically operated switch for controlling the circuit through said electro-responsive device, said electro-mechanically operated switch having two windings, one of said windings being energized when the motor circuit is closed, the other of said windings being energized when said braking switch is closed.

9. In a motor starting and stopping device, in combination, a variable resistance, a plurality of electro-magnetically operated resistance switches for removing said resistance from circuit gradually, a series relay switch for preventing the too rapid removal of said resistance from circuit, a main switch for connecting said resistance in series with the motor armature, a braking switch for connecting said resistance across the terminals of the armature, a mechanical brake, an electro-responsive device for maintaining said brake inoperative, an electro-magnetically operated switch for controlling the circuit through said electro-responsive device, said electro-magnetically operated switch having two windings one of said windings being energized when the motor circuit is closed, the other of said windings being energized when said braking switch is closed, and a master controller for controlling all of said switches.

10. In a motor starting and stopping device, in combination, a variable resistance, a plurality of electro-magnetically operated resistance switches for removing said resistance from circuit gradually, a series relay switch for preventing the too rapid removal of said resistance from circuit, a main switch for connecting said resistance in series with the motor armature, a braking switch for connecting said resistance across the terminals of the armature, interlocking means necessitating the insertion of all of said resistance in circuit before either said main switch or said braking switch can be operated and for preventing either of said switches being operated unless the other is inoperative, a mechanical brake, an electro-responsive device for maintaining said brake inoperative, an electro-magnetically operated switch for controlling the circuit through said electro-responsive device, said electro-magnetic switch having two windings, one of said windings being adapted to cause said switch to close when the motor circuit is closed, the other of said windings being adapted to cause said switch to close the circuit through said device when the braking switch is closed, and a master controller for controlling all of said switches.

11. In a motor controller, in combination, means for closing the motor circuit, means for establishing a dynamic braking circuit for the motor to stop the same, a mechanical brake, electroresponsive means for rendering said brake inoperative, and a single automatic switch for causing said electroresponsive means to respond upon closure of the motor circuit and to be maintained energized until the motor speed decreases to a predetermined degree under dynamic braking action.

12. In a controller for electric motors, in combination, means for closing the motor circuit, means for establishing a dynamic braking circuit for the motor, a mechanical brake, an electroresponsive winding for rendering said brake inoperative, an electroresponsive switch controlling the circuit of said winding, and circuit connections for causing said switch to respond upon closure of the motor circuit and for maintaining said switch energized after the dynamic braking circuit has been established.

13. In a controller for stopping an electric motor, means for connecting a variable resistance across the motor armature, means for automatically and gradually removing said resistance from circuit, a mechanical brake, electroresponsive means for maintaining said brake inoperative, and a single switch having two coils for controlling said electroresponsive means.

14. In a controller for stopping electric motors, the combination with means for connecting a variable resistance across the motor armature, means for automatically and gradually removing said resistance from circuit, a mechanical brake, electroresponsive means for controlling said brake, and a single switch having two windings, one being connected across the motor armature for maintaining said brake inoperative until the motor approaches a condition of rest.

15. In a controller for starting and stopping an electric motor, in combination, means for connecting the motor to a source of supply, means for connecting a circuit across the motor armature, a variable resistance in the armature circuit, means for automatically and gradually removing said resistance from circuit, a mechanical brake, electroresponsive means for maintaining said brake inoperative, and a switch controlling said electroresponsive means having two windings, one adapted to be connected to the source of supply, and the other being connected across the motor armature for maintaining said brake inoperative until the motor approaches a condition of rest.

16. In a controller for stopping an electric motor, in combination, means for connecting a variable resistance in circuit across the motor armature, a plurality of electromagnetic switches for gradually removing said resistance from circuit, means for preventing the too rapid removal of said resistance, a mechanical brake, and means for maintaining said brake inoperative until the motor approaches a condition of rest.

17. In a controller for stopping an electric motor, in combination, means for connecting a variable resistance in circuit across the motor armature, a plurality of electromagnetic switches for gradually removing said resistance from circuit, means for preventing the too rapid removal of said resistance, a mechanical brake, electroresponsive means for maintaining said brake inoperative, and a single switch having two coils for controlling said electroresponsive means.

18. In a controller for stopping an electric motor, in combination, means for connecting a variable resistance in circuit across the motor armature, a plurality of electromagnetic switches for gradually removing said resistance from circuit, means for preventing the too rapid removal of said resistance, a mechanical brake, electroresponsive means for maintaining said brake inoperative, and a single switch having two coils for controlling said electroresponsive means, one of said coils being connected in circuit to maintain said brake inoperative until the motor approaches a condition of rest.

In witness whereof, I have hereunto subscribed my name in the presence of two witnesses.

CLARK T. HENDERSON

Witnesses:
 FRANK H. HUBBARD,
 ALEXANDER H. LIDDERS.